(12) United States Patent
Sivasankar et al.

(10) Patent No.: US 10,153,986 B2
(45) Date of Patent: Dec. 11, 2018

(54) PORT MONITORING SYSTEM

(71) Applicant: Dell Products L.P., Round Rock, TX (US)

(72) Inventors: Ravikumar Sivasankar, San Jose, CA (US); Ashwin Kumar Jayaraman, Tamil Nadu (IN); Shree Murthy, San Jose, CA (US); Kannan Narayanan, Fremont, CA (US); Karthik Krishnamurthy, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 14/751,494

(22) Filed: Jun. 26, 2015

(65) Prior Publication Data
US 2016/0380924 A1    Dec. 29, 2016

(51) Int. Cl.
*H04L 12/741* (2013.01)
*H04L 12/931* (2013.01)
*H04L 12/26* (2006.01)

(52) U.S. Cl.
CPC ............ *H04L 49/208* (2013.01); *H04L 43/12* (2013.01)

(58) Field of Classification Search
CPC ......... H04L 43/00; H04L 12/00; H04L 45/00; H04L 49/00
USPC ........................................ 370/390, 392, 419
See application file for complete search history.

(56) References Cited

U.S. PATENT DOCUMENTS

| | | | | |
|---|---|---|---|---|
| 2009/0129384 A1* | 5/2009 | Regan | ................. | H04L 12/4641 370/390 |
| 2011/0299532 A1* | 12/2011 | Yu | ....................... | H04L 12/4625 370/392 |
| 2012/0291026 A1* | 11/2012 | Biswas | ................ | H04L 49/208 718/1 |
| 2013/0173784 A1* | 7/2013 | Wang | .................... | H04L 43/026 709/224 |
| 2015/0085694 A1* | 3/2015 | Agarwal | ................. | H04L 43/04 370/253 |
| 2015/0163173 A1* | 6/2015 | Chu | ........................ | H04L 49/45 370/338 |
| 2015/0207905 A1* | 7/2015 | Merchant | ................ | H04L 69/22 370/390 |

* cited by examiner

*Primary Examiner* — Melvin C Marcelo
*Assistant Examiner* — Natali Pascual Peguero
(74) *Attorney, Agent, or Firm* — Haynes and Boone, LLP

(57) ABSTRACT

A port monitoring system includes a first extending device. The first extending device includes a monitored port and a networking port. The first extending device is configured to detect a first packet at the monitored port and, in response, generate a mirrored packet. Then the first extending device adds a monitoring identifier to the mirrored packet and forwards the mirrored packet through the networking port. The port monitoring system also includes a networking device that is coupled to the first extending device. The networking device is configured to receive the mirrored packet from the first extending device and determine that the mirrored packet is associated with a monitoring port using the monitoring identifier provided by the mirrored packet. The networking device then forwards the mirrored packet to the monitoring port.

18 Claims, 10 Drawing Sheets

| E-Tag Ethertype | PCP | DEI | SRC-ECID Base | r | GRP | DST-ECID Base | SRC-ECID EXT | DST-ECID EXT |

802.1BR Tag Format

FIG. 6b

PORT MONITORING SYSTEM

BACKGROUND

The present disclosure relates generally to information handling systems, and more particularly to a port monitoring system for information handling systems.

As the value and use of information continues to increase, individuals and businesses seek additional ways to process and store information. One option available to users is an information handling system (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, switches, are utilized in a network to route traffic through the network. In a variety of different situations, it may be desirable to analyze traffic transmitted by a switch to, for example, track patterns of network traffic, detect and/or determine the cause of network failures, network congestion, network bottlenecks, and/or other network problems, perform debugging, and/or for a variety of other network analysis factors known in the art. Conventionally, such analysis may be performed using a port monitoring system. For example, traffic transmitted through a switch may be monitored by mirroring packets entering or exiting a monitored port on the switch, and forwarding the mirrored packets to a monitoring port. The mirrored packets forwarded to the monitoring port may then be examined by a management system with no disruption to the flow of packets at the actual destination port.

In some situations, switches may be provided as logical switches by a plurality of physical devices that operate to provide the logical switch. For example, a logical switch may be provided by one or more controlling bridges connected to one or more port extenders, with the controlling bridge(s) controlling the logical switch and viewing each of the ports on the port extender(s) as one of a plurality of virtual ports. In such situations, conventional port monitoring may raise some issues. For example, when monitoring a physical port (i.e., the "monitored port") on a port extender, the control bridge will mirror packets received at the virtual port associated with that monitored port. However, there is no guarantee that packets received at a virtual port are actually received at the monitored port, as those packets may be dropped at the intermediate switches, devices, or other subsystems that transmit the packet between the control bridge and the port extender. As such, conventional port monitoring in a logical switch may result in packets being mirrored to a management system when they are not actually received at the monitored port.

Accordingly, it would be desirable to provide an improved port monitoring system.

SUMMARY

According to one embodiment, an IHS includes a first extending device port that is configured to couple to a first extending device that includes a monitored port, a processing system coupled to the first extending device port, and a memory system coupled to the processing system and including instructions that, when executed by the processing system, cause the processing system to provide a controlling engine that configured to: receive, from a first extending device through the first extending device port, a mirrored packet that was sent in response to a packet detected at the monitored port and that includes a monitoring identifier; determine that the mirrored packet is associated with a monitoring port using the monitoring identifier; and forward the mirrored packet to the monitoring port.

BRIEF DESCRIPTION OF THE DRAWINGS

FIG. 3b is a schematic view illustrating an embodiment of a controlling database used with the networking device of FIG. 3a.

FIG. 4b is a schematic view illustrating an embodiment of a mirroring database used with the extending device of FIG. 4a.

FIG. 6b is a table illustrating an embodiment of a tag used in the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
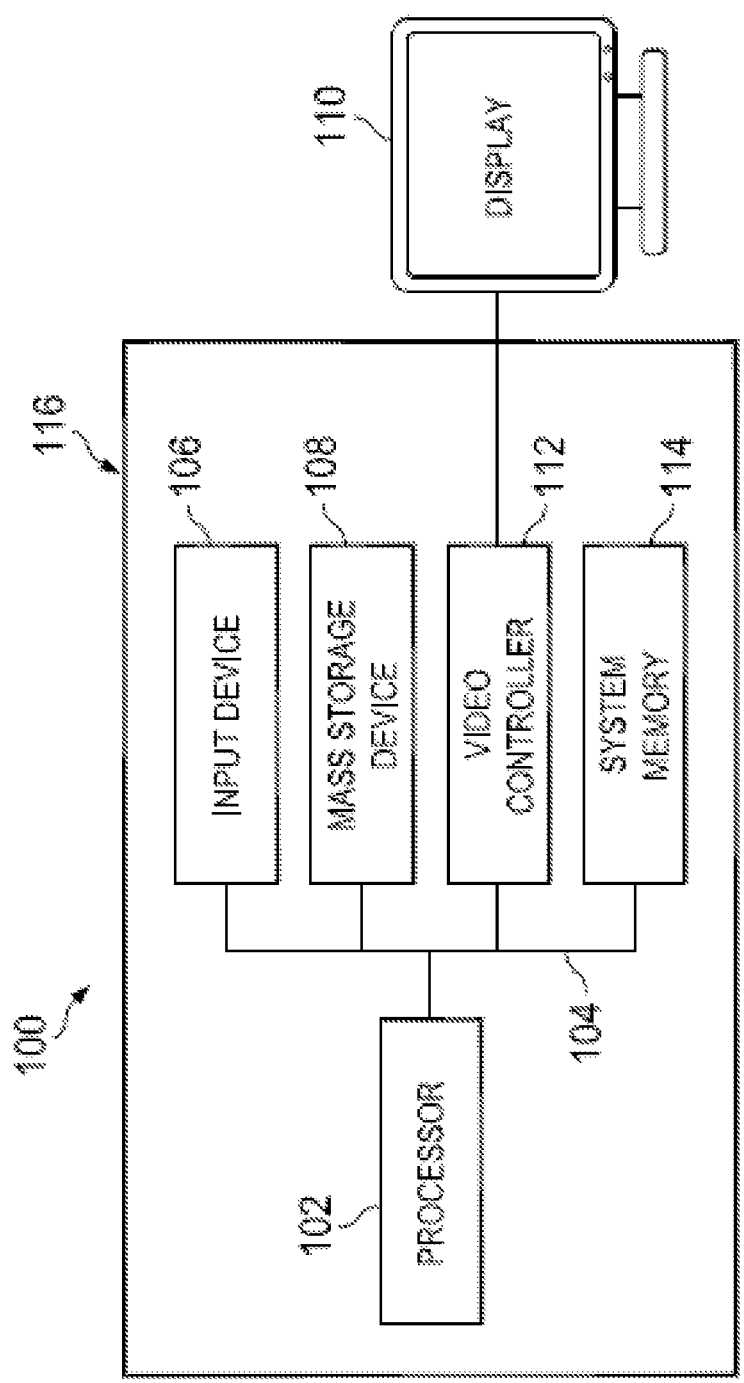
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
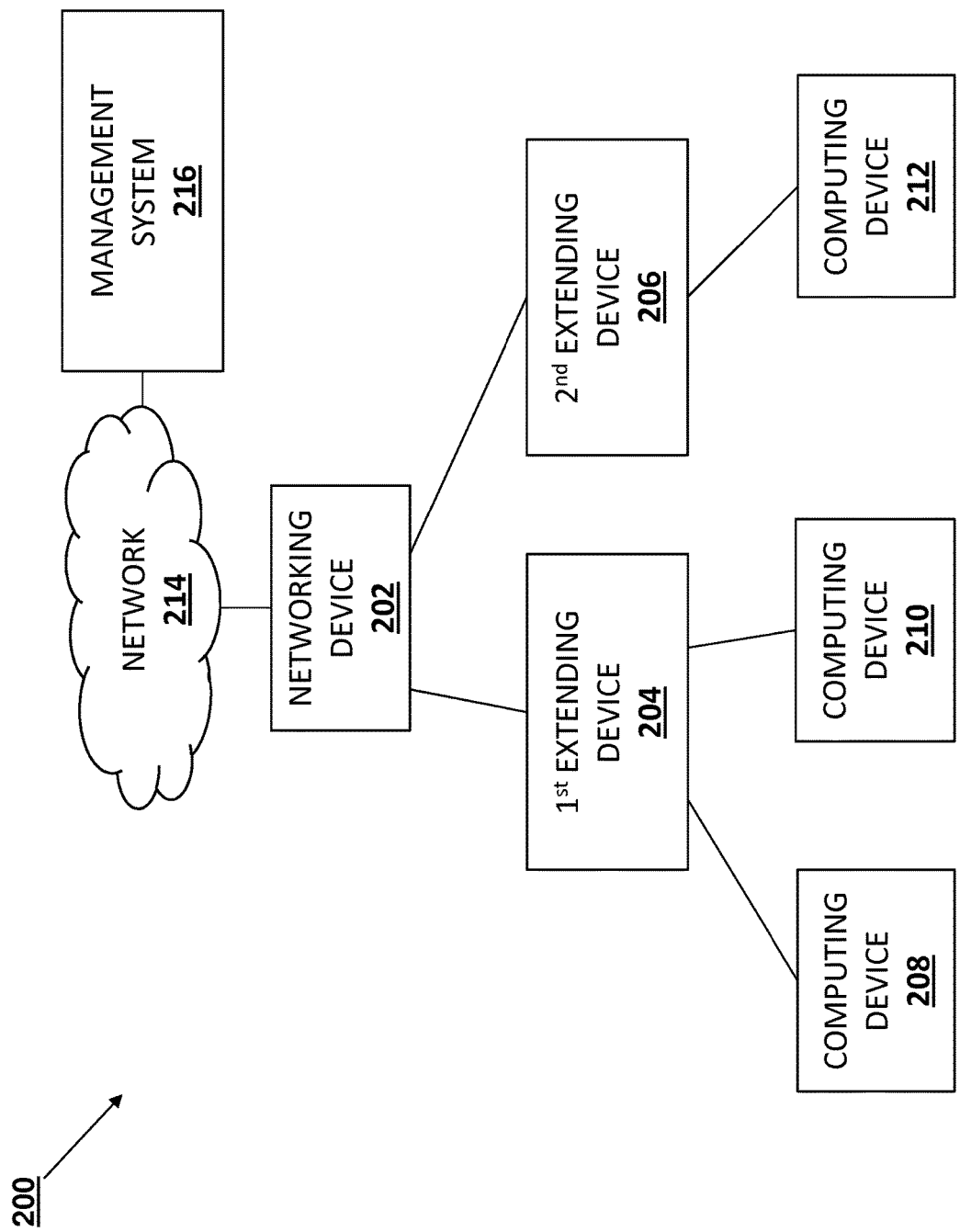
FIG. 2 is a schematic view illustrating an embodiment of a port monitoring system.

Referring now to FIG. 2, an embodiment of a port monitoring system 200 is illustrated. The port monitoring system 200 includes a networking device 202 that is coupled to an extending device 204 and an extending device 206. The port monitoring system 200 further includes a computing device 208 and a computing device 210 that are coupled to the extending device 204, and a computing device 212 that is coupled to the extending device 206. In an embodiment, any or all of the networking device 202, extending devices 204 and 206, and computing devices 208, 210, and 212 may be the IHS 100 discussed above with reference to FIG. 1 and/or include some or all of the components of the IHS 100. In specific embodiments, the networking device 202 may be a controlling bridge and/or a variety of other networking devices known in the art. In specific embodiments, the extending devices 204 and 206 may be port extenders and/or a variety of other extending devices known in the art. In specific embodiments, the computing devices 208, 210, and 212 may be desktop computing systems, laptop/notebook computing systems, tablet computing systems, phones, server computing systems, storage computing systems, monitoring computing systems, wireless access points, and/ or a variety of other computing systems known in the art. The networking device 202 is coupled to a network 214. In specific embodiments, the network 214 may be Internet, a virtual local area network (VLAN), a local area network (LAN) and/or a variety of other networks known in the art. The port monitoring system 200 may further include a management system 216 that is coupled to the network and that may include software and/or hardware tools that track and analyze network performance as discussed in further detail below, as well as any other functionality for analyzing mirrored data traffic in a networked system. While specific types, numbers, and configurations of the networking devices, extending devices, computing devices, network, and management system are illustrated and discussed herein, one of skill in the art in possession of the present disclosure will recognize that any number, types, and configurations of networking devices, extending devices, computing devices, networks, and management systems will fall within the scope of the present disclosure.

Figure 3A:
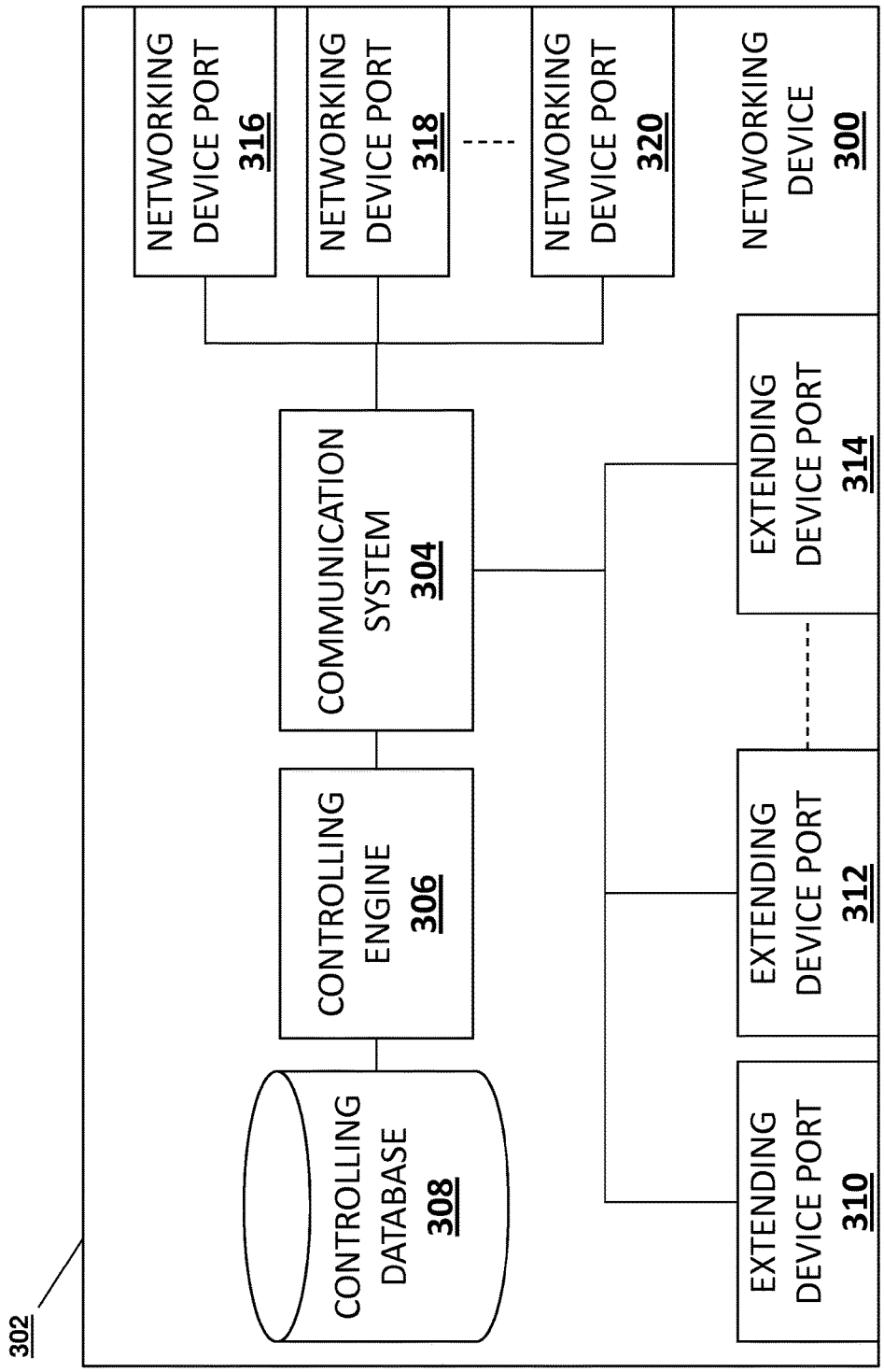
FIG. 3a is a schematic view illustrating an embodiment of a networking device used in the port monitoring system of FIG. 2.

Referring now to FIG. 3a, an embodiment of a networking device 300 is illustrated. In an embodiment, the networking device 300 may be the IHS 100 discussed above with reference to FIG. 1 and/or may include some or all of the components of the IHS 100. In an embodiment, the networking device 300 may be the networking device 202 illustrated in FIG. 2. In the embodiment discussed below, the networking device 300 is a controlling bridge that operates with one or more extending devices to provide a logical networking device, but one of skill in the art in possession of the present disclosure will recognize that the teachings of the present disclosure may be applied to any of a variety of other networking devices known in the art. The networking device 300 includes a chassis 302 that houses a communication system 304 that may include a variety of different communication system components (e.g., a network interface controller (NIC), a wireless communication system, etc.) that provide a variety of communication systems functionality known in the art. In a specific embodiment, the communication system 304 is configured to communicate with other devices via the Internet, VLANs, and/or using a variety of other networking features known in the art.

The chassis 302 of the networking device 300 may house a processing system (not illustrated, but which may be substantially similar to the processor 102 discussed above with reference to FIG. 1) and a memory system (not illustrated, but which may be substantially similar to the system memory 114 discussed above with reference to FIG. 1) that includes instructions that, when executed by the processing system, cause the processing system to provide a controlling engine 306 that is coupled to the communication system 304 (e.g., via a coupling between the processing system and the communication system 304) and that is configured to perform the functions of the controlling engines and networking devices discussed below. The networking device 300 also includes a controlling database 308 that may be included in a storage system (not illustrated, but which may be substantially similar to the storage device 108 discussed above with reference to FIG. 1) that is housed in the chassis 302 and coupled to the controlling engine 306 (e.g., via a coupling between the processing system and the storage device). While the controlling database 308 is illustrated and described as included on a storage system that is housed in the chassis 302 of the networking device 300, the controlling database 308 may be included on a storage system that is located outside of the chassis 302 of the networking device 300 and coupled to the controlling engine 306 (e.g., through a network via the communication system 304).

The networking device 300 also includes an extending device port 310, an extending device port 312, and up to an extending device port 314. The extending device ports 310, 312, and 314 may be networking ports (e.g., Ethernet ports) that are configured to couple to extending devices such as, for example, the extending devices 204 and 206 illustrated in FIG. 2, and exchange packets with the extending devices 204 and 206 as discussed in further detail below. The networking device 300 may also include a networking device port 316, a networking device port 318, and up to a networking device port 320. The networking device ports 316, 318, and 320 may be networking ports (e.g., Ethernet ports) that are configured to couple to other networking devices and/or a network such as, for example, the network 214 illustrated in FIG. 2, and may be configured to exchange packets with other networking devices or the network 214 as discussed in further detail below. In a specific embodiment, the communication system 304 is configured to communicate with other devices including the extending devices and other networking device via the Internet, VLANs, and/or a variety of other networks known in the art through the extending device ports 310, 312, and 314 and/or the networking device ports 316, 318, and 320.

Figure 3B:
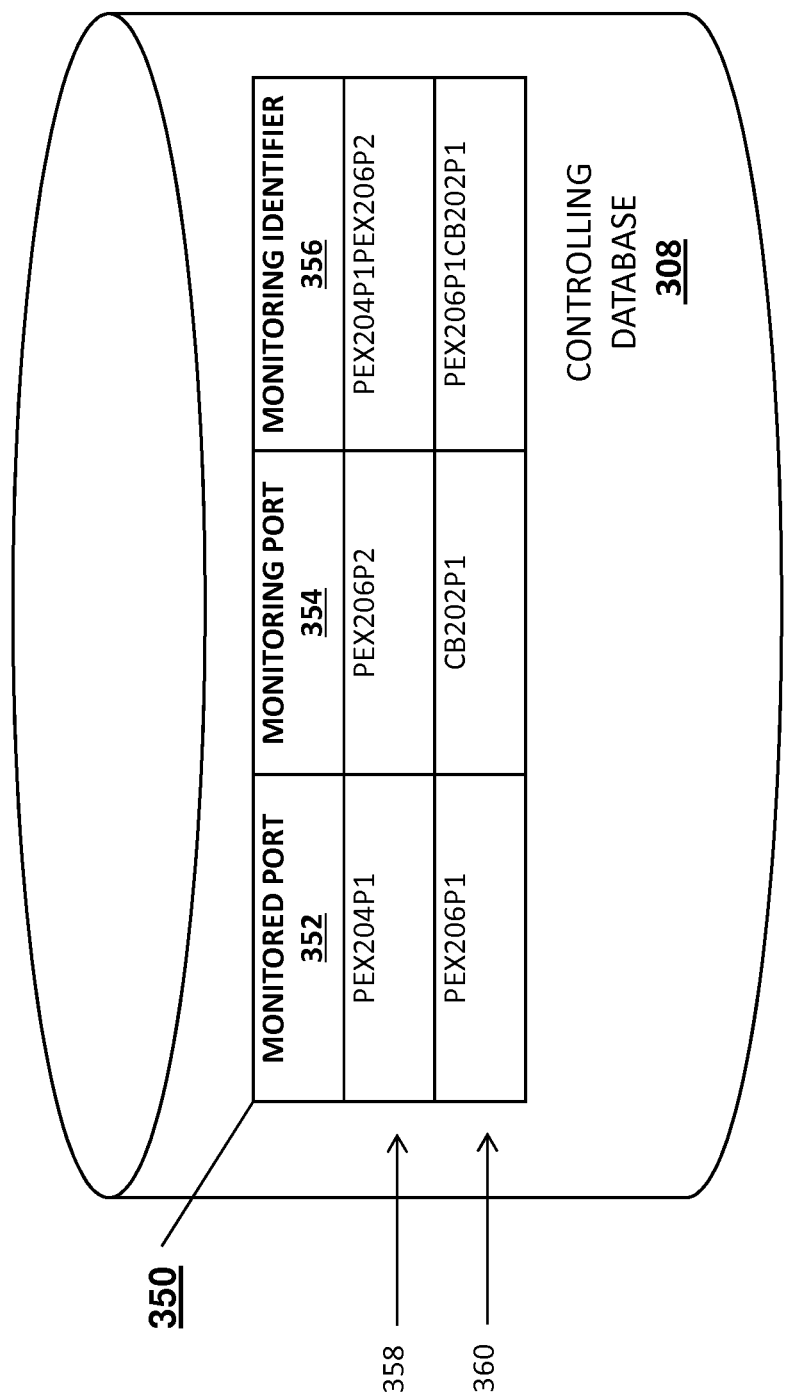

Referring now to FIG. 3b, an embodiment of the controlling database 308 discussed above with reference to FIG. 3a is illustrated. In the illustrated embodiment, the controlling database 308 includes a controlling table 350 having columns that provide a monitored port field 352, a monitoring port field 354, and a monitoring identifier field 356 for any of a plurality of rows in the controlling table 350. As discussed in further detail below, each row in the controlling table 350 of the controlling database 308 may provide a monitoring association between monitored port(s), monitoring port(s), and a monitoring identifier via information populated in the controlling table 350, which may be received from a user that is configuring the monitoring association.

For example, using the port monitoring system 200 discussed above with reference to FIG. 2, the monitored port field 352 for a particular row in the controlling table 350 may include an identifier for a monitored port on the extending device 204 (e.g., "PEX204P1") that is defined by a monitoring association 358 configured/provided by a user, the monitoring port field 354 for that particular row may include an identifier for a monitoring port on the extending device 206 (e.g., "PEX206P2") that is defined by the monitoring association 358 configured/provided by the user, and the monitoring identifier field 356 for that particular row may include a monitoring identifier (e.g., "PEX204P1PEX206P2") for the monitoring association 358 that is allocated by the controlling engine 306. Similarly, the monitored port field 352 for a particular row in the controlling table 350 may include an identifier for a monitored port on the extending device 206 (e.g., "PEX206P1") that is defined by a monitoring association 360 configured/provided by a user, the monitoring port field 354 for that particular row may include an identifier for a monitoring port (e.g., "CB202P1") on the control bridge/networking device 202 that is defined by the monitoring association 360 configured/provided by the user, and the monitoring identifier field 356 for that particular row may include a monitoring identifier (e.g., "PEX206P1CB202P1") for the monitoring association 360 that is allocated by the controlling engine 306. As such, a user may define monitoring associations that identify monitored ports and monitoring ports, and the identities of the monitored and monitoring ports may be associated together and with a monitoring identifier that is allocated by the system.

One of skill in the art in possession of the present disclosure will recognize that the controlling table may be modified depending on the characteristics of the port monitoring system in which it is implemented. For example, in some embodiments, fields may be added that identify, for example, a monitored traffic direction that indicates a direction of traffic that should be monitored at the port (e.g., ingress, egress, or both), and/or a variety of other monitoring information known in the art. In another example, fields may be added to identify that multiple monitored ports are associated with one monitoring port, or that one monitored port is associated with multiple monitoring ports. As such, a wide variety of information other than that which is illustrated may be provided as a monitoring association and included in a row of the controlling table 350 while remaining within the scope of the present disclosure.

Figure 4A:
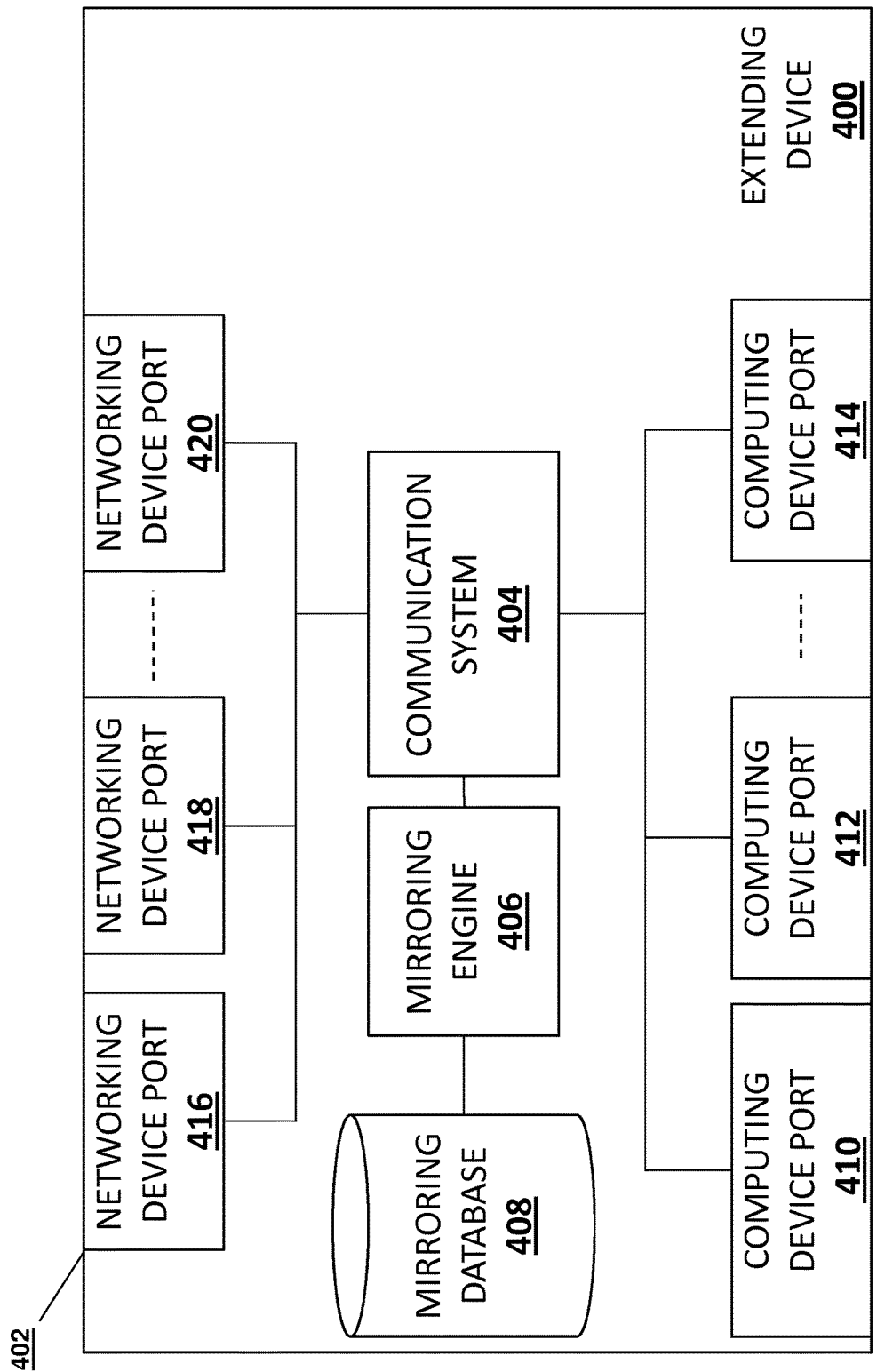
FIG. 4a is a schematic view illustrating an embodiment of an extending device used in the port monitoring system of FIG. 2.

Referring now to FIG. 4a, an embodiment of an extending device 400 is illustrated. In an embodiment, the extending device 400 may be the IHS 100 discussed above with reference to FIG. 1 and/or may include some or all of the components of the IHS 100. In an embodiment, the extending device 400 may be either or both of the extending devices 204 and 206 illustrated in FIG. 2. In the embodiments discussed below, the extending device 400 is a port extender that operates with one or more controlling bridges to provide a logical networking device (e.g., by providing its ports to "extend" the number of ports available to the controlling bridge(s)), but one of skill in the art in possession of the present disclosure will recognize that the teachings of the present disclosure may be applied to a variety of other networking devices known in the art. The extending device 400 includes a chassis 402 that houses a communication system 404 that may include a variety of different communication system components (e.g., a network interface controller (NIC), wireless communication systems, etc.) that provide a variety of communication systems known in the art. In a specific embodiment, the communication system 404 is configured to communicate with networking devices via the Internet, VLANs, and/or using a variety of other networking features known in the art.

The chassis 402 of the extending device 400 may house a processing system (not illustrated, but which may be substantially similar to the processor 102 discussed above with reference to FIG. 1) and a memory system (not illustrated, but which may be substantially similar to the system memory 114 discussed above with reference to FIG. 1) that includes instructions that, when executed by the processing system, cause the processing system to provide a mirroring engine 406 that is coupled to the communication system 404 (e.g., via a coupling between the processing system and the communication system 404) and that is configured to perform the functions of the mirroring engines and extending devices discussed below. The extending device 400 also includes a mirroring database 408 that may be included in a storage system (not illustrated, but which may be substantially similar to the storage device 108 discussed above with reference to FIG. 1) that is housed in the chassis 402 and coupled to the mirroring engine 406 (e.g., via a coupling between the processing system and the storage device). While the mirroring database 408 is illustrated and described as included on a storage system that is housed in the chassis 402 of the extending device 400, the mirroring database 408 may be included on a storage system that is located outside of the chassis 402 of the extending device 400 and coupled to the mirroring engine 406 (e.g., through a network via the communication system 404).

The extending device 400 may include a computing device port 410, a computing device port 412, and up to a computing device port 414. The computing device ports 410, 412, and 414 may be networking ports (e.g., Ethernet ports) that are configured to couple to computing devices such as, for example, the computing devices 208, 210, and 212 illustrated in FIG. 2, and may be configured to exchange packets with the computing devices 208, 210, and 212 illustrated in FIG. 2. The extending device 400 may further include a networking device port 416, a networking device port 418, and up to a networking device port 420. The networking device ports 416, 418, and 420 may be networking ports (e.g., Ethernet ports) that are configured to couple to networking devices such as, for example, the networking device 202 illustrated in FIG. 2, and may be configured to exchange packets with the networking device 202. In a specific embodiment, the communication system 404 is configured to communicate with other devices including the computing devices and networking devices via the Internet, VLANs, and/or using a variety of other networking feature s known in the art using the computing device ports 401, 412, and 414 and/or the networking device ports 416, 418, and 420.

Figure 4B:
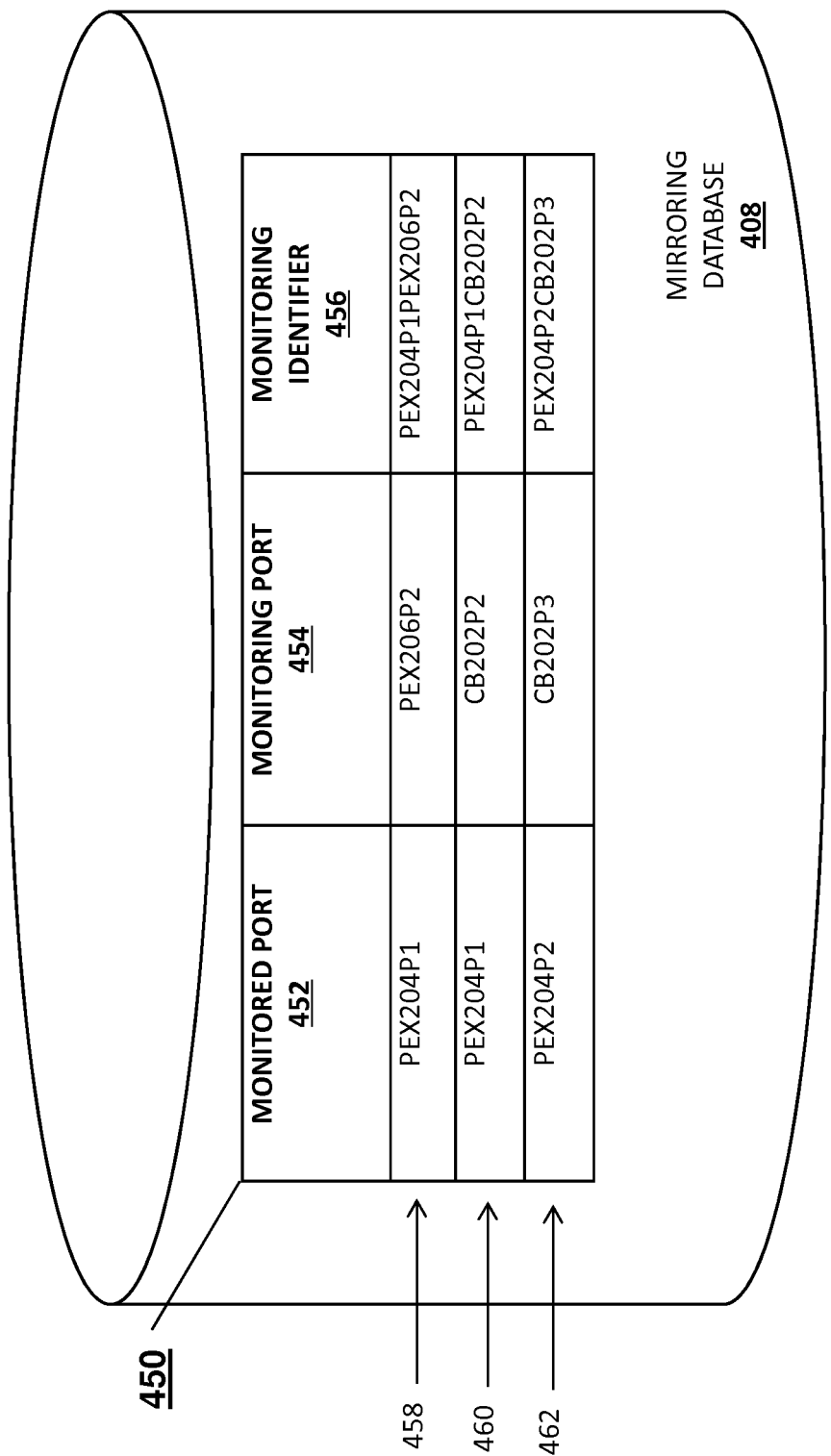

Referring now to FIG. 4b, an embodiment of a mirroring database 408 discussed above with reference to FIG. 4a is illustrated. In the illustrated embodiment, the mirroring database 408 includes a mirroring table 450 having columns that provide a monitored port field 452, a monitoring port field 454, and a monitoring identifier field 456 for any of a plurality of rows in the mirroring table 450. As discussed in further detail below, each row in the controlling table 450 of the mirroring database 408 may be populated with information for a monitoring association received from a networking device (e.g., the networking device 202). In one embodiment, the mirroring database 408 and/or the mirroring table 450 may be updated by the networking device 202 illustrated in FIG. 2 through a control protocol such as, for example, the Port Extension Control and Status Protocol (PE CSP).

For example, using the port monitoring system 200 discussed above with reference to FIG. 2, a monitoring association 458 may define a monitored port and a monitoring port such that the monitored port field 452 for a particular row in the mirroring table 450 includes an identifier for a monitored port on the extending device 204 (e.g., "PEX204P1"), the monitoring port field 454 for that particular row includes an identifier for a monitoring port on the extending device 206 (e.g., "PEX206P2"), and the monitoring identifier field 456 for that particular row includes an identifier for the monitoring association 458 (e.g., "PEX204P1PEX206P2"). Similarly, a monitoring association 460 may define a monitored port and a monitoring port such that the monitored port field 452 for a particular row in the mirroring table 450 includes an identifier for a monitored port on the extending device 204 (e.g., "PEX204P1"), the monitoring port field 454 for that particular row includes an identifier for a monitoring port on the control bridge/networking device 202 (e.g., "CB202P2"), and the monitoring identifier field 456 for that particular row includes an identifier for the monitoring association 460 (e.g., "PEX204P1CB202P2"). Similarly, a monitoring association 462 may define a monitored port and a monitoring port such that the monitored port field 452 for a particular row in the mirroring table 450 includes an identifier for a monitored port on the extending device 204 (e.g., "PEX204P2"), the monitoring port field 454 for that particular row includes an identifier for a monitoring port on the control bridge/networking device 202 (e.g., "CB202P3"), and the monitoring identifier field 456 for that particular row includes an identifier for the monitoring association 462 (e.g., "PEX204P2CB202P3"). As discussed below, the identifiers for the monitored port and the monitoring port, along with the monitoring identifier, may be received as part of the monitoring association from a networking device (e.g., the networking device 202 illustrated in FIG. 2).

One of skill in the art in possession of the present disclosure will recognize that the mirroring table 450 may be modified depending on the characteristics of the port monitoring system in which it is implemented. For example, in some embodiments, fields may be added that identify, for example, a monitored traffic direction that indicates a direction of traffic that should be monitored at the port (e.g., ingress, egress, or both), a status of the monitoring association (e.g., enabled or disabled), and/or a variety of other monitoring information known in the art. In another example, fields may be added to identify that multiple monitored ports are associated with one monitoring port, or that one monitored port is associated with multiple monitoring ports. As such, a wide variety of information other than that which is illustrated may be provided as a monitoring association and included in a row of the mirroring table 450 while remaining within the scope of the present disclosure.

Figure 5:
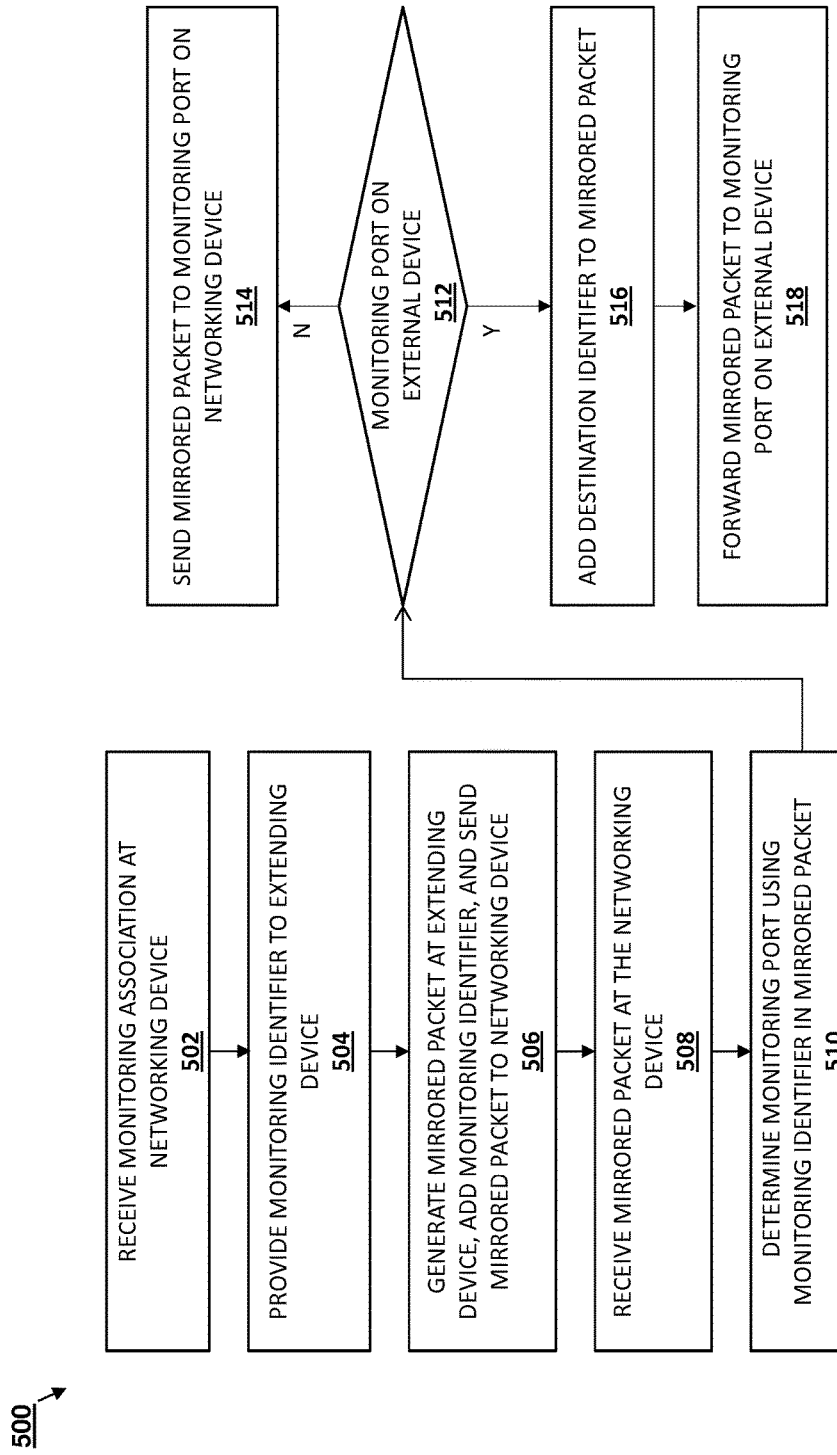
FIG. 5 is a flow chart illustrating an embodiment of a method for monitoring ports.

Referring now to FIG. 5, an embodiment of a method 500 for monitoring ports is illustrated. The embodiments of the method 500 are discussed below with reference to FIGS. 6a-6c, which provide examples of the port monitoring systems of FIG. 2 operating according to the method 500, as well as an embodiment of a tag that may be used in the method 500. The method 500 provides for the monitoring of ports when a plurality of devices (e.g., the control bridge and port extenders described below) are used to provide a logical switch, and operates by performing the mirroring functionality at the physical port that is being monitored (e.g., on the port extender) rather than at a virtual port that is associated with the physical port that is being monitored. This is accomplished, at least in part, by creating and sharing between the devices monitoring associations of monitored port(s) and monitoring port(s), and identifying those monitoring associations in the mirrored packets that are destined for monitoring ports on a different device than the monitored port. As such, packets that are mirrored and received at the monitoring port can be assured to have been received at the physical port that is being monitored. However, one of skill in the art in possession of the present disclosure will recognize that a wide variety of modification to the embodiments discussed below (different configurations of the port monitoring system 200, other networking device(s) performing the method 500, etc.) will fall with the scope of the present disclosure. Furthermore, one of skill in the art will recognize that the packets that are received at the monitored ports below and mirrored according to the method 500 may be unicast packets or multicast packets, as the structure and function of the systems and methods of the present disclosure address either situation.

Figure 6A:
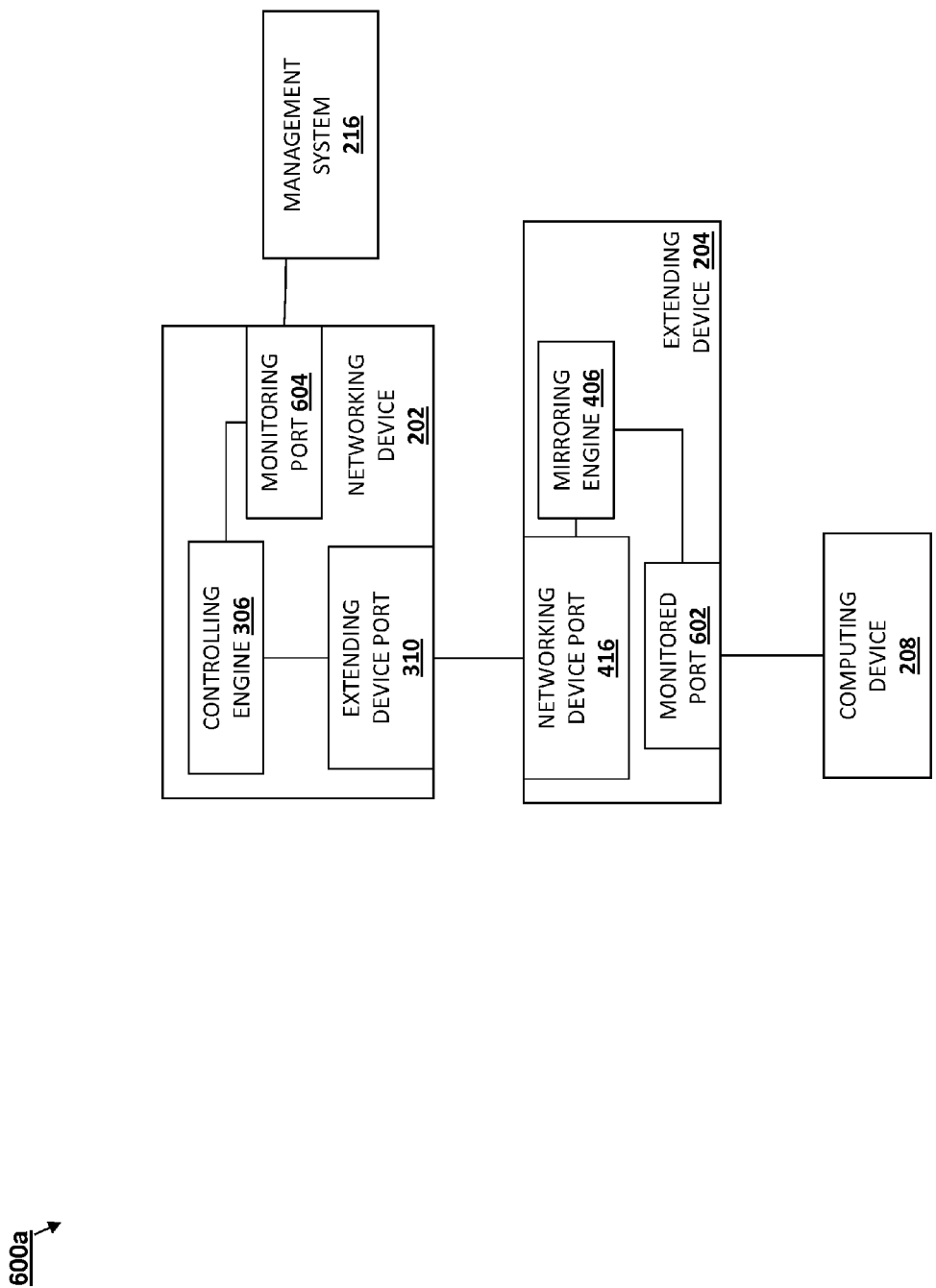
FIG. 6a is a schematic view illustrating an embodiment of the port monitoring system of FIG. 2 operating according to the method of FIG. 5.
Figure 6C:
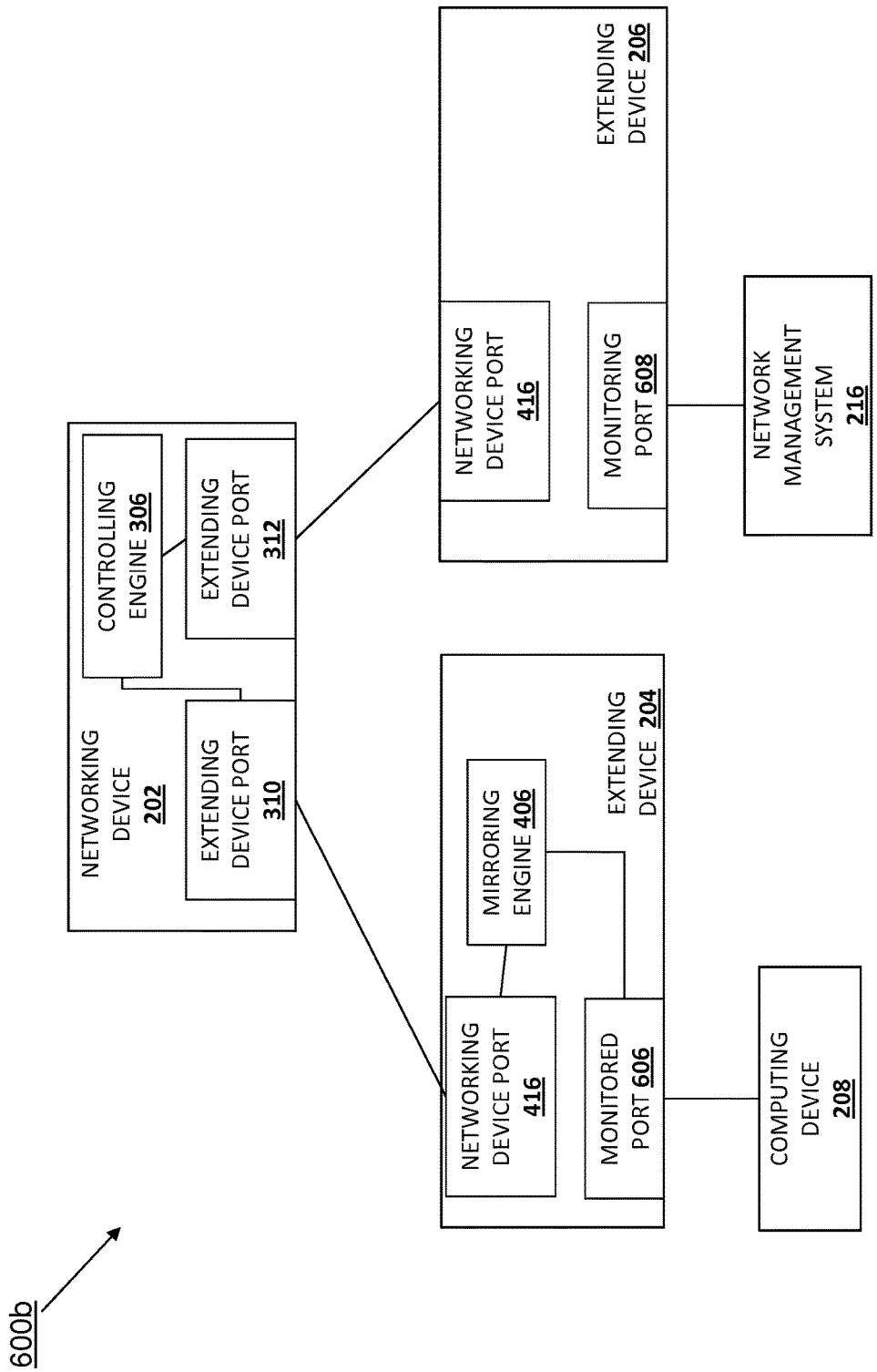
FIG. 6c is a schematic view illustrating an embodiment of the port monitoring system of FIG. 2 operating according to the method of FIG. 5.

The method 500 begins at block 502, where a networking device receives a monitoring association. Referring to FIGS. 6a and 6c, embodiments 600a and 600b of the port monitoring system 200 of FIG. 2 are illustrated that include some (or all) of the features of the port monitoring system 200 in order to describe specific functionality of the port monitoring system 200. In those embodiments, the networking device 202 may be the networking device 300 illustrated and described with reference to FIGS. 3a and 3b, and the extending devices 204 and 206 may be the extending device 400 illustrated and described with reference to FIGS. 4a and 4b. In an embodiment, at block 502, a user or network administrator may configure/provide the monitoring association to the networking device 202. The monitoring association provided by the user or network administrator may include identifiers for monitored port(s) and monitoring port(s). The identification of a monitored port may include the provision (via input devices, a file transfer, and/or other information transfer method known in the art) of identification information of the monitored port such as, for example, one or more of a network address (e.g., MAC address, IP address, or Host address), an interface type (e.g., Ethernet), a slot number, a port number, and/or other port identification information known in the art. Similarly, the identification of a monitoring port may include the provision (via input devices, a file transfer, and/or other information transfer method known in the art) of identification information of the monitoring port such as, for example, one or more of a network address (e.g., MAC address, IP address, or Host address), an interface type (e.g., Ethernet), a slot number, a port number, and/or other port identification information known in the art. In other embodiments, the monitoring association provided by the user or network administrator may also include monitored traffic direction(s) for the monitored port (e.g., ingress, egress, or both), monitoring association statuses (e.g. disabled or enabled), and/or other monitoring/mirroring information known in the art.

In some embodiments, the monitoring association configured/provided by the user or network manager may include additional criteria for the monitoring of flow-based data transfer. For example, when it is desirable to mirror flow-based data transfers, the monitoring association may include source(s) of data to be monitored, source(s) of data that need not to be monitored, and/or a variety of other flow-based criteria known in the art. Such sources of data may be identified by specific addresses such as MAC addresses, IP addresses, VLANs, and/or other identifiers known in the art.

With reference to FIGS. 3a and 3b, in response to receiving the monitoring association by the networking device 202 at block 502 (e.g., through the communications system 304), the controlling engine 306 in the networking device 202 stores the monitoring association in the controlling table 350 of the controlling database 308 as described above. The controlling engine 306 may also store any additional criteria or information in the monitoring association (e.g., in additional columns in the controlling table 352). In one embodiment, if specific monitoring association information is not provided with the monitoring association configured/provided by the user or network administrator, a default value may be assigned and stored in association with the monitoring association by the controlling engine 306. For example, if monitored traffic directions are not provided in the monitoring association, a default value of "both" (e.g., indicating that both ingress traffic and egress traffic are monitored) may be assigned and stored in the controlling table 352 by the controlling engine 306.

In the embodiment illustrated in FIG. 6a, the monitoring association configured/provided by a user or network administrator has defined a monitored port 602 on the extending device 204 and a monitoring port 604 on the networking device 202. With reference to FIG. 3a, the monitored port 602 may be any of the computing device ports 410, 412, and 414, and is coupled to the computing device 208 illustrated in FIG. 2. With reference to FIG. 4a, the monitoring port 604 may be any of the networking device ports 316, 318, and 320, and is coupled to the management system 216. In the embodiment illustrated in FIG. 6c, the monitoring association configured/provided by a user or network administrator has defined a monitored port 606 on the extending device 204 and a monitoring port 608 included on the extending device 206. With reference to FIG. 3a, the monitored port 606 may be any of the computing device ports 410, 412, and 414, and is coupled to the computing device 208 illustrated in FIG. 2. With reference to FIG. 4a, the monitoring port 608 may be any of the computing device ports 410, 412, and 414 and is coupled to the management system 216.

The method 500 then proceeds to block 504, where a monitoring identifier for the monitoring association is provided to an extending device. In an embodiment, if a monitoring association includes a monitored port that is on an extender device and a monitoring port that is not on that extending device, a monitoring identifier is allocated for that monitoring association and that monitoring association is provided to the extending device. Referring to FIG. 6a, the extending device 204 includes the monitored port 602 and the networking device 202 includes the monitoring port 604, and as such the controlling engine 306 in the networking device 202 may allocate a monitoring identifier for the monitoring association between the monitored port 602 and the monitoring port 604. Referring to FIG. 6c, the extending device 204 includes the monitored port 606 and the extending device 206 includes the monitoring port 608, and as such the controlling engine 306 in the networking device 202 may allocate a monitoring identifier for the monitoring association between the monitored port 606 and the monitoring port 608. In one example, a monitoring agent in the networking device 202 (e.g., provided by the controlling engine 306) may, prior to or upon receiving a mirroring association, request a monitoring manager (e.g., provided by the controlling engine 306) to allocate monitoring identifiers as one or more reserved ECIDs for the mirroring operations discussed below. One of skill in the art in possession of the present disclosure will recognize that the reserved ECIDs allocated and utilized below would not be available for port identification, virtual port creation, and/or other conventional port monitoring functionality known in the art.

The controlling engine 306 may then provide the monitoring association to the extending device 204 through the extending device port 310 on the networking device 202. Referring to FIG. 6a, the extending device 204 includes the monitored port 602, and the controlling engine 306 in the networking device 202 may allocate a monitoring identifier for the monitoring association between the monitored port 602 and the monitoring port 604 as discussed above, and provide the monitoring association to the extending device 204 through the extending device port 310 and the networking device port 416. Referring to FIG. 6c, the extending device 204 includes the monitored port 606, and the controlling engine 306 in the networking device 202 may allocate a monitoring identifier for the monitoring association between the monitored port 606 and the monitoring port 608 as discussed above, and provide the monitoring association to the extending device 204 through the extending device port 310 and the networking device port 416.

The mirroring engine 406 in the extending device 204 receives monitoring association including the monitoring identifier through the networking device port 416, and stores the monitoring association in the mirroring table 450 in the mirroring database 408 as discussed above. In one embodiment, the controlling engine 306 in the networking device 202 stores the monitoring association in the mirroring database 408 in the extending device 204 through a control protocol. In another embodiment, the mirroring engine 406 in the extending device 204 stores the monitoring association received from the networking device 202 in the mirroring database 408 in the extending device 204. As such, monitoring associations between a monitored port on a first device and a monitoring port on the second device may be created and provided to the device that includes the monitored port.

The method 500 then proceeds to block 506, where a mirrored packet is generated at the extending device, a monitoring identifier is added to the mirrored packet, and the mirrored packet is sent to the networking device. In one embodiment, the mirroring engine 406 in the extending device 204 may detect (e.g. through the communication system 404) that a packet has been received (e.g., ingress or egress) at a port on the extending device 204. For example, the computing device 208 may send a packet that is received at a port on the extending device 204, or the networking device 202 may forward a packet to the extending device 204 that is directed to that computing device 208 connected to the extending device 204 such that it is forwarded by the extending device 204 through a port connected to that computing device 208. In response to detecting that a packet has been received at a port on the extending device 204, the mirroring engine 406 may reference the mirroring table 450 in the mirroring database 408 to determine whether that port is part of a monitoring association in the mirroring table 450. As such, a packet may be received at one of the computing device ports 410-414 that is not part of a monitoring association, and the mirroring engine 406 will determine that no mirroring is required. However, a packet may be received at the monitored port 602 that is part of a monitoring association, and the mirroring engine may determine that mirroring is required.

In some embodiment of block 506, the mirroring engine 406 may determine whether a packet received at a port that is included in a monitoring association needs to be mirrored for that particular monitoring association using information in the mirroring table 450. For example, the monitoring engine 406 may examine whether the traffic direction of the received packet matches the traffic direction identified by the particular monitoring association (e.g., for ingress-only or egress-only mirroring), whether the particular monitoring association is disabled, whether the source of the received packet satisfies a source requirement (e.g., for flow-based mirroring), etc. Following the determination that the received packet at the monitored port 602 requires mirroring based on that packet being received at a monitored port for which a monitoring association exists (and satisfying any other requirements for that monitoring association), the mirroring engine 406 generates a mirrored packet of the received packet In one embodiment, the mirrored packet may be a copy of the received packet. In some embodiments, the mirrored packet may include a copy of some, but not all, of the information included in the received packet. For example, portions of the received packet that are not needed in the monitoring of the port may be truncated or otherwise removed from the mirrored packet. In yet another embodiment, the mirrored packet may include information about the received packet without actually copying any portion of the received packet. In yet another embodiment, information may be added to the mirrored packet that was not present in the received packet. For example, additional encapsulations and/or headers may be added to the mirrored packet (relative to the received packet) so as to allow the forwarding, tunneling, or otherwise sending of the mirrored packet to the monitoring device (which may be located, for example, on a different network).

After the mirrored packet is generated, the mirroring engine 406 provides the monitoring identifier of the monitoring association for the monitored port 602 in the mirrored packet, and inserts the monitoring identifier in the mirrored packet. In one embodiment, the monitoring identifier may be inserted in a field of an ETag as defined by the IEEE801.1BR standard, as described in detail below. In a specific embodiment, the networking device 202 is a controlling bridge and the extending devices 204 and 206 are port extenders, and the controlling bridge and the port extender(s) may operate as a single logical switch under the Institute of Electrical and Electronics Engineers (IEEE) 802.1Q standard, 802.1BR standard, and/or other standards known in the art. In some embodiments, the control bridge and port extenders may also operate under the VNTAG approach and/or other port extender standards or approaches known in the art. The IEEE 801.IBR standard provides for the attachment of tags to packets that are processed through the controlling bridge and the port extender, and those tags may be an ETag of a form illustrated in FIG. 6b, where PCP is a priority code, DEI is a drop eligible indicator, SRC-ECID Base identifies the ingress echannel identifier of the service request with the packet, r indicates a reserved bit, GRP encodes part of the echannel identifier parameter of the service request associated with the packet, DST ECID Base is the destination echannel identifier parameter associated with this packet, SRCE ECID EXT encodes part of the ingress echannel identifier of the service request associated with the packet, and DST ECID EXT is the destination echannel identifier parameter of the service request associated with this packet. Under the IEEE 802.1BR standard, the mirrored packet generated by the mirroring engine 406 may include tags, e.g., an ETag. At block 506, the mirroring engine 406 may insert the monitoring identifier in a field in the Etag in the mirrored packet. For example, the monitoring identifier may be provided in the SRC ECID entry/packet field of the ETag in the mirrored packet. In an embodiment, the monitoring identifier may be provided in the DST ECID entry/packet field of the ETag in the mirrored packet. In an embodiment, the monitoring identifier may be provided using a combination of the SRC ECID entry and the DST ECID entry (e.g., encoded using both the SRC ECID packet field and the DST ECID packet field).

Referring to FIG. 6a or 6c, the mirrored packet with the monitoring identifier may then be forwarded by the mirroring engine 406 to the networking device 202. For example, the mirroring engine 406 in the extending device 204 may use the mirroring table 450 in the mirroring database 408 to identify the networking device port 416 on the extending device 204 that is coupled to the networking device 202 that has access to the monitoring port at which the mirrored packet is directed, and forward the mirrored packet to networking device 202 through the networking device port 416. In other embodiments, storage subsystems other than the mirroring database 408 (e.g. forwarding tables, access control lists (ACLs), etc.) and/or engines other than the mirroring engine 406 may be utilized to route the mirrored packet with the monitoring identifier to the networking device 202 through the networking device port 604 on the extending device 204 while remaining within the scope of the present disclosure.

The method 500 then proceeds to block 508, where the networking device receives the mirrored packet. Referring to FIG. 6a or 6c, the networking device 202 receives the mirrored packet through the extending device port 310 that is coupled to the extending device 204.

The method 500 then proceeds to block 510, where the networking device determines the monitoring port using the monitoring identifier in the mirrored packet. In one embodiment, the controlling engine 306 in the networking device 202 may retrieve the monitoring identifier from the mirrored packet. For example, the controlling engine 306 may identify the monitoring identifier in the SRC ECID entry or DEST ECID entry in the ETag in the mirrored packet. Using the monitoring identifier, the controlling engine 306 may reference the controlling table 350 to identify the monitoring port for the mirrored packet. Referring to FIG. 6a, the controlling engine 306 may use the monitoring identifier with the controlling table 350 in the controlling database 308 to identify the monitoring association along with the monitoring port 604 for that monitoring association. Referring to FIG. 6c, the controlling engine 306 may use the monitoring identifier with the controlling table 350 in the controlling database 308 to identify is the monitoring association along with the monitoring port 608 for that monitoring association.

In one embodiment, subsequent to determining the monitoring port at block 510, the controlling engine 306 may remove the monitoring identifier from the mirrored packet. For example, the controlling engine 306 may remove the monitoring identifier from the SRC ECID entry or DEST ECID entry in the ETag in the mirrored packet.

The method 500 then proceeds to decision block 512, where it is determined whether the monitoring port is on a device that is external to the networking device. In an embodiment, the controlling engine 306 determines whether the monitoring port determined at block 510 is included on its associated networking device, or if that monitoring port is included on a device that is external to and connected or coupled to its associated networking device. If it is determined that the monitoring port is included on the networking device 202, the method 500 proceeds to block 514 where the mirrored packet is sent to the monitoring port on the networking device. FIG. 6a illustrates an embodiment where the monitoring port 604 is included on the networking device 202. At block 516, the controlling engine 306 may forward the mirrored packet through the monitoring port 604 to the management system 216. The management system 216 may receive the mirrored packet and utilize the mirrored packet for performing port analytics, troubleshooting, debugging, and/or a variety of other monitoring functions known in the art.

If it is determined at decision block 512 that the monitoring port is on an external device, the method 500 proceeds to block 516, where a destination identifier is added to the mirrored packet. FIG. 6c illustrates an embodiment where the monitoring port 608 is included on an extender device 206 that is external to the networking device 202. However, in other embodiments, the monitoring port 614 may be included on an external device that may be a computing device, a different networking device, and/or other devices known in the art. At block 516, the controlling engine 306 adds a destination identifier to the mirrored packet. For example, the controlling engine 306 may add the destination identifier to the DST ECID entry and DST ECID EXT entry of the ETag in the mirrored packet.

The method 500 then proceeds to block 518, where the networking device forwards the mirrored packet to the monitoring port on the external device. Referring to FIG. 6c, the controlling engine 306 forwards the mirrored packet through the extending device port 312 that is coupled to the extending device 206. In an embodiment, the networking device 202 may perform an ACL lookup to forward the mirrored packet to the extending device 206.

At block 518, the extending device 206 receives the mirrored packet through the networking device port 416 and the extending device 206 performs a lookup using the destination identifier in the mirrored packet and a forwarding table to identify the monitoring port 608. The extending device 206 then forwards the mirrored packet through the monitoring port 608 to a management system 216. The management system 216 may then utilize the mirrored packet for performing port analytics, troubleshooting, debugging, and/or a variety of other monitoring functions known in the art.

In some embodiments, the systems and methods described herein may not utilize the monitoring identifiers discussed above. In one specific embodiment, the monitoring association configured/provided by the user or network administer may define a monitored port and a monitoring port that are included on the same extending device. For example, referring to FIG. 4a, a monitoring association may define the computing device port 410 on the extending device 400 as the monitored port, and the computing device port 412 on the extending device 400 as the monitoring port. In such an embodiment, it is not necessary to allocate a monitoring identifier for that monitoring association and provide monitoring identifiers in mirrored packets that are created in response to packets that are received at the computing device port 412/monitored port. Instead, upon receiving a packet at the computing device port 410, the extending device 400 may determine that the computing device port 410 is being monitored, generate a mirrored packet, and send the mirrored packet directly to the computing device port 412 as in performed in conventional port monitoring systems. In another specific embodiment, the monitoring association configured/provided by the user or network administer may define a monitored port on a networking device (e.g., a controlling bridge), and a monitoring port on an extending device. In such an embodiment, it is not necessary to allocate a monitoring identifier for the monitoring association and provide the monitoring identifier in mirrored packets that are created in response to packets received at the monitored port. Instead, upon receiving a packet at the monitored port on the networking device, the networking device may determine that the monitored port is being monitored, generate a mirrored packet, and send the mirrored packet to the monitoring port on the extending device as in performed in conventional port monitoring systems.

Thus, systems and methods have been described that provide for monitoring ports. Some embodiments of the systems and methods include a plurality of devices that provide a logical switch. As discussed above, conventional port monitoring in such a system may result in packets being mirrored to a management system when they are not actually received at the physical port that is intended to be monitored. The systems and methods of the present disclosure address such issues and provide more accurate port monitoring by generating mirrored packets at the device that includes the physical port that is being monitored, and utilizing monitoring associations and monitoring identifiers to ensure that the mirrored packet is forwarded to monitoring port that is connected to the management system performing the monitoring.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A port monitoring system, comprising:
   a logical networking device that includes a virtual port and that is provided by:
   a first physical extending device that includes a physical networking port and a physical monitored port that is associated with the virtual port, wherein the first extending device is configured to:

detect, at the physical monitored port, a first packet that is received from the virtual port;
generate, in response to detecting the first packet, a mirrored packet;
add a monitoring identifier that is associated with a first physical monitoring port to the mirrored packet; and
forward the mirrored packet through the physical networking port; and
a physical networking device that is coupled to the first physical extending device and that controls the logical networking device and views the physical monitored ort on the first physical extending device as the virtual port included on the logical networking device, and wherein the physical networking device is configured to:
receive the mirrored packet from the first physical extending device;
determine the first physical monitoring port for the mirrored packet using the monitoring identifier; and
forward the mirrored packet to the first physical monitoring port.

2. The port monitoring system of claim 1, wherein the physical networking device is configured to:
remove the monitoring identifier from the mirrored packet before forwarding the mirrored packet to the first physical monitoring port.

3. The port monitoring system of claim 1, wherein the physical networking device is configured to:
receive the monitoring association that defines the physical monitored port and the first physical monitoring port and, in response, allocate the monitoring identifier to the monitoring association, wherein the first physical extending device is configured to receive the monitoring identifier from the physical networking device.

4. The port monitoring system of claim 1, wherein the first extending device is configured to:
detect, at the physical monitored port, a second packet that is addressed to the virtual port;
generate, in response to detecting the first packet, a second mirrored packet;
add a second monitoring identifier that is associated with a first physical monitoring port to the second mirrored packet; and
forward the second mirrored packet through the physical networking port.

5. The port monitoring system of claim 1, wherein the logical networking device further comprises:
a second physical extending device that is coupled to the physical networking device, wherein the first physical monitoring port is included on the second physical extending device.

6. The port monitoring system of claim 1, wherein the monitoring identifier is provided in an extended channel identifier (ECID) packet field in the mirrored packet.

7. The port monitoring system of claim 1, wherein the monitoring identifier is associated with a second physical monitoring port, and wherein the physical networking device is configured to:
determine the second physical monitoring port for the mirrored packet using the monitoring identifier; and
forward the mirrored packet to the second physical monitoring port.

8. An information handling system (IHS), comprising:
a first physical extending device port that is configured to couple to a physical extending device;
a processing system coupled to the first physical extending device port;
a memory system coupled to the processing system and including instructions that, when executed by the processing system, cause the processing system to provide a controlling engine that configured to:
control a logical networking device that is provided, at least in part, by a first physical extending device that is coupled to the first physical extending device port, wherein the first physical extending device includes a physical monitored port that is viewed as a virtual port on the logical networking device by the controlling engine;
receive, from the first physical extending device through the first physical extending device port, a mirrored packet that was sent by the first physical extending device in response to a packet that was detected at the physical monitored port and that includes a monitoring identifier that is associated with a first physical monitoring port, wherein the packet that was detected at the physical monitored port was received from the virtual port;
determine the first physical monitoring port for the mirrored packet using the monitoring identifier; and
forward the mirrored packet to the first physical monitoring port.

9. The IHS of claim 8, wherein the controlling engine is configured to:
receive a monitoring association that defines the physical monitored port on the first physical extending device and the first physical monitoring port and, in response, allocate the monitoring identifier to the monitoring association; and
send the monitoring identifier to the first physical extending device.

10. The IHS of claim 8, further comprising:
a second physical extending device port that is configured to couple to a physical extending device, wherein the controlling engine is configured to forward the mirrored packet to the first physical monitoring port that is included on a second physical extending device that is coupled to the second physical extending device port.

11. The IHS of claim 8, wherein the monitoring identifier is provided in an extended channel identifier (ECID) packet field in the mirrored packet.

12. The IHS of claim 8, wherein the
the monitoring identifier is associates with a second physical monitoring port, and wherein the controlling engine is configured to:
determine the second physical monitoring port for the mirrored packet using the monitoring identifier; and
forward the mirrored packet to the second physical monitoring port.

13. A method for monitoring ports, comprising:
receiving, by a physical networking device that controls a logical networking device from a first physical extending device that provides at least a portion of the logical networking device and that includes a physical monitored port that is viewed as a virtual port on the logical networking device by the physical networking device, a mirrored packet that was sent in response to a packet that was detected by the first physical extending device at the physical monitored port and that includes a monitoring identifier that is associated with a monitoring port, wherein the packet that was detected by the first physical extending device at the physical monitored port was received from the virtual port;

determining, by the physical networking device, the monitoring port for the mirrored packet using the monitoring identifier; and forwarding, by the networking device, the mirrored packet to the monitoring port.

14. The method of claim 13, further comprising:

receiving, by the physical networking device, the monitoring association that defines the physical monitored port on the first physical extending device and the monitoring port, and, in response, allocating the monitoring identifier to the monitoring association; and sending, by the physical networking device, the monitoring identifier to the first physical extending device.

15. The method of claim 14, further comprising:

removing, by the physical networking device, the monitoring identifier from the mirrored packet before forwarding the mirrored packet to the monitoring port.

16. The method of claim 13, wherein the monitoring port is included on a second physical extending device that is coupled to the physical networking device and that is included in the logical networking device.

17. The method of claim 16, wherein the forwarding the mirrored packet to the monitoring port includes:

adding, by the physical networking device, a destination identifier to the mirrored packet;

determining, by the physical networking device, a physical networking port on the networking device using the destination identifier; and forwarding, by the physical networking device, the mirrored packet through the physical networking port to the monitoring port on the second physical extending device.

18. The method of claim 13, wherein the monitoring identifier is provided in an extended channel identifier (ECID) packet field in the mirrored packet.

* * * * *